J. Z. BENEDICT.
HAND CART.
APPLICATION FILED MAR. 1, 1919.

1,350,058.

Patented Aug. 17, 1920.

Invention
James Z. Benedict
By J. M. St. John
Atty

UNITED STATES PATENT OFFICE.

JAMES Z. BENEDICT, OF CEDAR RAPIDS, IOWA.

HAND-CART.

1,350,058. Specification of Letters Patent. Patented Aug. 17, 1920.

Application filed March 1, 1919. Serial No. 280,078.

*To all whom it may concern:*

Be it known that I, JAMES Z. BENEDICT, a citizen of the United States, residing at Cedar Rapids, in the county of Linn and State of Iowa, have invented certain new and useful Improvements in Hand-Carts; and I do hereby declare the following to be a full, clear, and exact description of the invention, such as will enable others skilled in the art to which it appertains to make and use the same.

This invention relates to hand-carts, and the object of the invention is to provide such carts with means whereby they may be easily helped over obstructions, such as curbs and embankments which means may be shifted so as to be out of the way when the cart is used as a dump-cart. A further object is to provide for the latching of the end-gate, so as to prevent its rising and spilling the contents of the cart, when passing over such obstructions.

The nature of the invention is fully disclosed in the description and claims following, reference being had to the accompanying drawing, in which—

Figure 1:
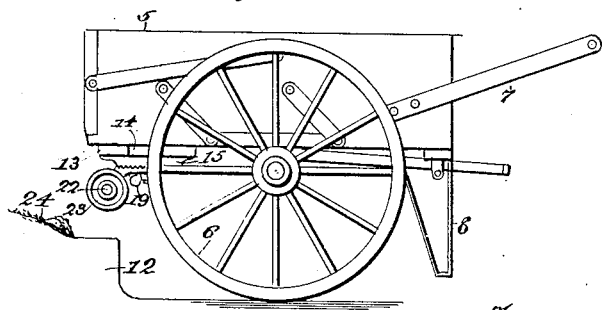
Figure 4:
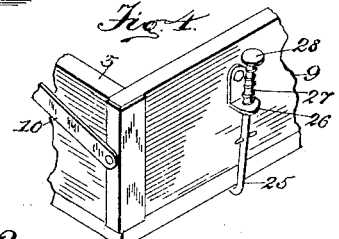
Figure 2:
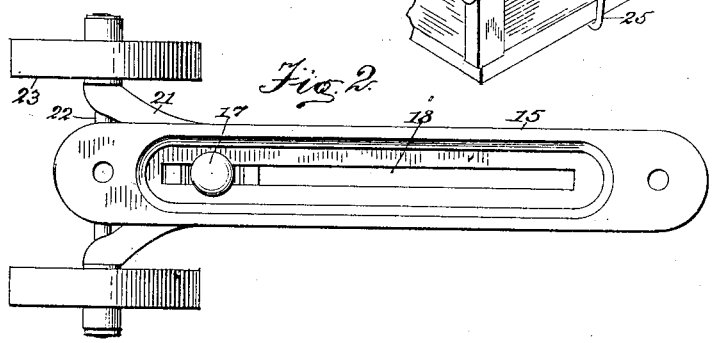
Figure 3:
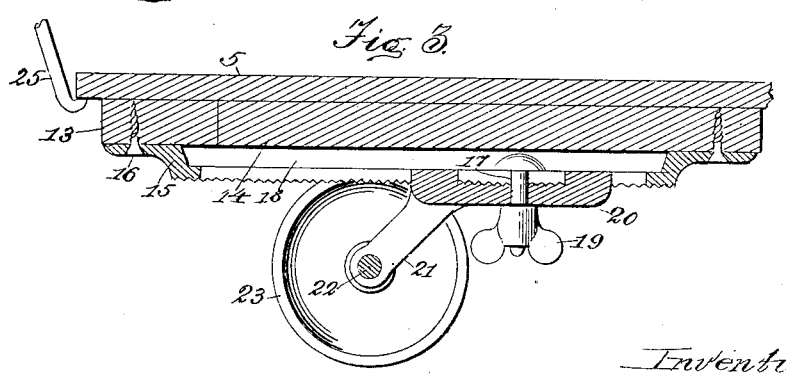

Figure 1 is a side elevation of a push-cart embodying my improvements. Fig. 2 is a plan view of a supplemental wheel device for aiding the operator of the cart in passing over obstructions. Fig. 3 is a central longitudinal section of the same. Fig. 4 is a view in perspective illustrating the end-gate latch.

In the drawing, the numeral 5 denotes the body of a hand-cart carried by wheels 6. The cart is pushed by a handle 7, and has a supporting leg 8 on which it rests in part, when not in use, or while being loaded.

In a general utility cart it is desirable to adapt the same to the carrying of commodities in a closed body or box, and to the transportation of matter to be dumped, such as earth, ashes, and the like. In either case the leg should support the body in a stable position when at rest, but its foot should normally be high enough to clear the ground when the wheels are in a hollow. So also there should be nothing in front of the main carrying wheels to strike the opposite bank, when they are in such a hollow, that is to say, nothing that cannot be easily moved out of the way. When, however, the cart encounters a high obstruction, like a pavement curb 12, it is very desirable to have pilot wheels which may, by tilting the cart, rest on top of the curb, and serve as a fulcrum in pushing and lifting the cart over the obstruction. The device for this purpose will now be described.

Beneath the forward end of the body is a cleat 13. To this and a supplemental cleat 14 is secured a base-plate 15, as by screws 16. The upper part of the base-plate is hollowed so as to receive the head of a bolt 17, which passes through and may run freely in a slot 18. To the under side of the base-plate is secured by this bolt and its thumb-nut 19 a bracket 20, with devergent arms 21 carrying a shaft or axle 22. On this axle are mounted wheels 23, turning freely thereon. To prevent any possible slippage of the bracket the adjoining faces of the base-plate and bracket are preferably serrated, as shown. When an obstruction is to be passed, the wheels and bracket are easily and quickly shifted to the forward position shown in Fig. 1. When not so needed they are as easily shifted to a rearward position entirely out of the way, as shown in Fig. 3, this being very desirable when the contents of the cart body are to be dumped forwardly.

Having thus described my invention, I claim:

1. In a hand-cart, the combination of carrying-wheels, a body mounted thereon, a base-plate attached near the forward end of the body and lengthwise thereof, a bracket mounted under said base-plate and slidable endwise thereof, means for fastening the bracket to the base, and wheels carried by said bracket, the wheels and bracket being slidable forward to fulcruming position, and back out of such position.

2. Combined with the body of a hand-cart having carrying wheels, of a hollowed, slotted and serrated base-plate attached to the under side of the body forward of the carrying wheels and lengthwise of the body, a serrated bracket slidable endwise of the base-plate, means for fastening the bracket and base-plate together, and wheels carried by said bracket at each side, the bracket and wheels being movable and securable in and out of fulcruming position.

In testimony whereof I affix my signature in presence of two witnesses.

JAMES Z. BENEDICT.

Witnesses:
F. W. ARMSTRONG,
J. M. ST. JOHN.